UNITED STATES PATENT OFFICE.

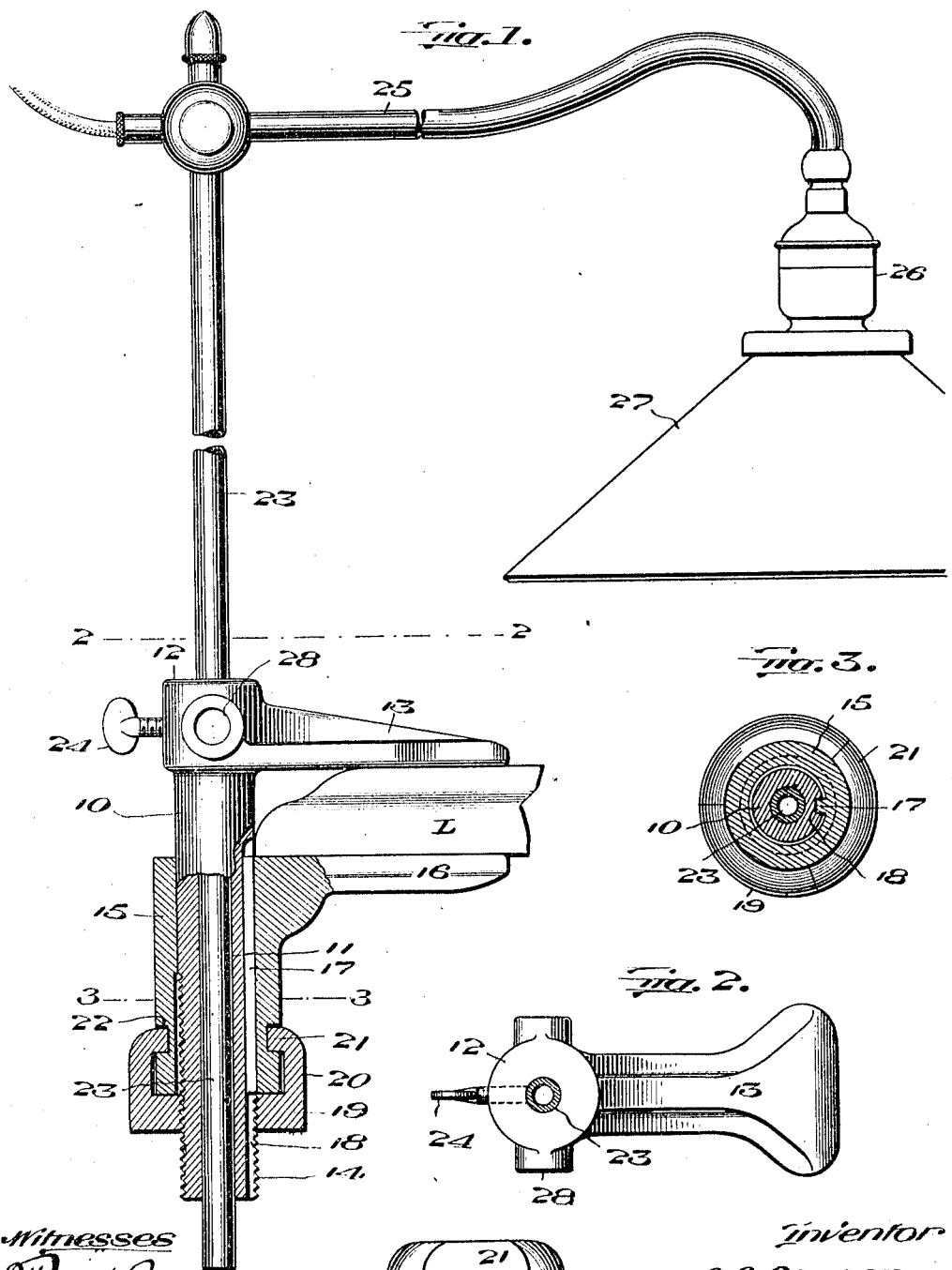

CHARLES C. COUPER, OF NORFOLK, VIRGINIA.

CLAMP FOR BRACKETS.

1,241,823.     Specification of Letters Patent.     Patented Oct. 2, 1917.

Application filed April 5, 1917. Serial No. 160,041.

*To all whom it may concern:*

Be it known that I, CHARLES C. COUPER, a citizen of the United States, residing at Norfolk, in the county of Norfolk and State of Virginia, have invented new and useful Improvements in Clamps for Brackets, of which the following is a specification.

This invention relates to clamps, and has as its objects to provide an improved clamp adapted to serve as a support for lamp brackets, telephones, and the like, and which may be readily and securely attached to a supporting ledge, such as the edge of a table or desk; to provide a clamp which is simple in construction, in that it is composed of a relatively few number of parts; and to provide a clamp which will permit of quick and secure attachment and with which a wide range of adjustability may be obtained.

In the accompanying drawings, I have shown one embodiment of my invention but it is to be noted that the present disclosure is by way of illustration only, and is not restrictive of my invention, for my invention is susceptible of various changes and modifications which would be within the spirit of the invention without departing from the scope of the appended claims.

Figure 1 is a side view of my improved clamp secured to a supporting ledge and carrying an electric lamp bracket, parts of the clamp being broken away for purpose of illustration.

Fig. 2 is a sectional view taken on line 2—2, Fig. 1.

Fig. 3 is a sectional view taken on line 3—3, Fig. 1.

Fig. 4 is a side elevational view of an adjusting nut by means of which the jaws of the clamps are moved relatively to each other.

Referring to the drawings wherein like numerals represent like parts in the several views, 10 designates a shank portion having a through axial bore or opening 11. The shank 10 terminates at its upper end in a head 12 from which projects a fixed jaw 13, and the lower end of the shank is threaded for a portion of its length, as at 14.

The shank 10 is surrounded by a longitudinally movable sleeve 15 having an outwardly extending jaw 16 corresponding to and in alinement with the jaw 13 of the shank portion. The internal bore of the sleeve 15 has a longitudinal rib 17 which engages in a groove or guideway 18 passing longitudinally along one side of the shank portion 10. With the tongue and groove arrangement just described, the sleeve is permitted to move longitudinally relative to the shank, but relative rotary movement therebetween is prevented.

In threaded engagement with the threaded portion 14 of the shank portion 10 is a clamping nut 19 having an upstanding annular flange 20 which receives the lower end of the sleeve 15, and this flange is turned or curved inwardly at its outer end so as to provide an annular lip 21 which engages in a circumferential groove 22 in the sleeve 15 adjacent its lower end.

In the drawings I have shown my improved clamp applied to a ledge L which may be the edge of a table, desk, or the like, and the clamp is disclosed as carrying a lamp bracket, but it is to be understood that my improved clamp is equally applicable for carrying a telephone bracket, an oil lamp, or the like. The rod 23 of the bracket is shown as extending through the central bore 11 of the shank portion, and it is secured in adjusted position therein by means of a thumb-screw 24. The rod 23 adjustably carries a horizontal arm 25 to the outer end of which is attached an electric light socket 26 to which is secured a lamp shade 27.

It will be noted from Figs. 1 and 2 of the drawings that the head 12 is provided with a transverse opening 28 which intersects the longitudinal opening 11 and into which is adapted to project the inner end of the thumb-screw 24. It will be seen by this arrangement that in those cases where it is desired to secure the clamp to a vertical ledge, the bracket, in the present case, the rod 23 may be inserted through the opening 28 and secured in adjusted position by means of the thumb-screw 24.

It is to be noted that my device comprises but relatively few parts, and the construction of these parts is such that they are relatively strong. The nut 19 is rotatively secured to the movable sleeve 15 so that all danger of unscrewing the nut from the shank portion and losing or misplacing the same is eliminated. In securing my improved clamp to a ledge, the jaws 13 and 16 are brought into such positions as to straddle the ledge L, and the nut 19 is then turned in the proper direction so as to move the movable jaw 16 toward the fixed jaw 13, rotary movement of the sleeve 15 being prevented due to the rib and groove arrangement between the sleeve and the shank portion.

What I claim is:—

1. A clamp for brackets comprising a shank portion having a through central opening adapted to receive a standard or rod of the bracket, a jaw carried by said shank portion, a sleeve slidably mounted about said shank portion, a jaw on said sleeve, and means for securing said sleeve in adjusted position on said shank portion.

2. A clamp for brackets comprising a shank portion having a through opening adapted to receive a standard or rod of the bracket, a fixed jaw on said shank portion, a sleeve about said shank portion, a jaw on said sleeve, and a nut in threaded engagement with said shank portion and engaging said sleeve for locking the latter in adjusted position.

3. A clamp for brackets comprising a shank portion having a through opening adapted to receive a standard or rod of the bracket, a fixed jaw on said shank portion, a sleeve about said shank portion, a jaw carried by said sleeve, a nut in threaded engagement with said shank portion, and a connection between said nut and sleeve permitting rotary movement therebetween.

4. A clamp for lamp brackets comprising a shank portion having a through opening adapted to receive a rod or standard of the bracket, a fixed jaw on said shank portion, a sleeve about said shank portion, a jaw carried by said sleeve, means for preventing rotary movement between said sleeve and said shank portion while permitting longitudinal movement therebetween, and a nut in threaded engagement with said shank portion and rotatably carried by said sleeve.

5. A clamp for lamp brackets comprising a shank portion having a through opening adapted to receive a rod or standard of the bracket, a fixed jaw on said shank portion, a sleeve about said shank portion, a jaw carried by said sleeve, a tongue and groove connection between said shank portion and said sleeve, and a nut in threaded engagement with said shank portion and engaging said sleeve for securing the sleeve in adjusted position on said shank portion.

6. A clamp for lamp brackets comprising a shank portion having a through opening adapted to receive a rod or standard of the bracket, a fixed jaw on said shank portion, a sleeve about said shank portion, a jaw carried by said sleeve, said shank portion having a groove along one side, said sleeve having an internal longitudinal rib fitting in said groove, and a nut in threaded engagement with said shank portion and engaging said sleeve for securing the sleeve in adjusted position on said shank portion.

7. A clamp for brackets comprising a shank portion having a through opening adapted to receive a standard or rod of the bracket, a fixed jaw on said shank portion, a sleeve about said shank portion, a jaw carried by said sleeve, said sleeve having an external circumferential groove adjacent its lower end, and a nut in threaded engagement with said shank portion and having an annular flange to receive the lower end of said sleeve, said flange being inturned to provide a lip adapted to engage in the groove in said sleeve.

In testimony whereof I have hereunto set my hand in presence of two subscribing witnesses.

CHARLES C. COUPER.

Witnesses:
J. W. CHAPMAN,
E. L. HARGROVE.

Copies of this patent may be obtained for five cents each, by addressing the "Commissioner of Patents Washington, D. C."